Oct. 25, 1960  K. GEBELE  2,957,398
DEPTH OF FIELD INDICATOR FOR PHOTOGRAPHIC CAMERAS
Filed Jan. 3, 1956  3 Sheets-Sheet 1

Oct. 25, 1960

K. GEBELE 2,957,398

DEPTH OF FIELD INDICATOR FOR PHOTOGRAPHIC CAMERAS

Filed Jan. 3, 1956

Oct. 25, 1960  K. GEBELE  2,957,398
DEPTH OF FIELD INDICATOR FOR PHOTOGRAPHIC CAMERAS
Filed Jan. 3, 1956  3 Sheets-Sheet 3
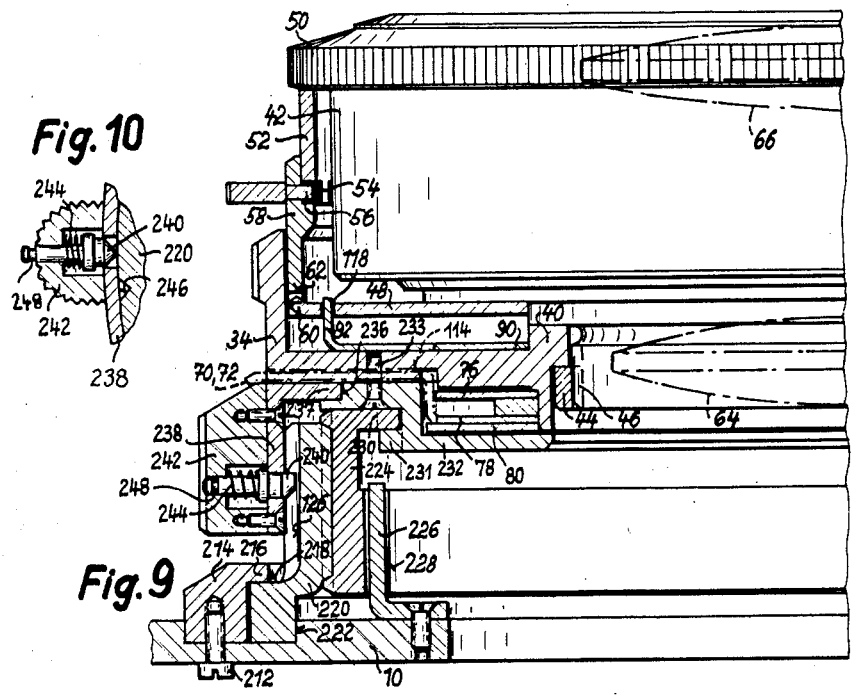
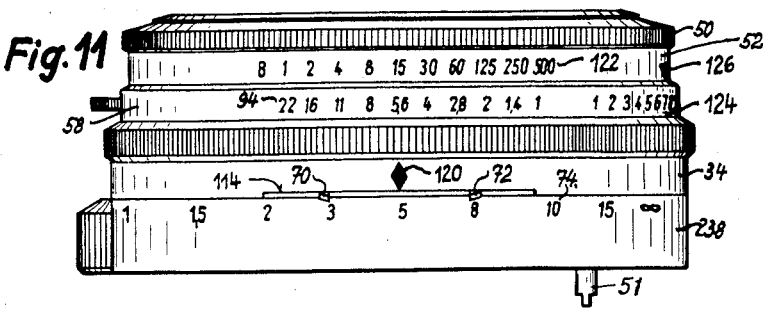

United States Patent Office 2,957,398
Patented Oct. 25, 1960

2,957,398

DEPTH OF FIELD INDICATOR FOR PHOTOGRAPHIC CAMERAS

Kurt Gebele, Munich, Germany, assignor, by mesne assignments, to Compur-Werk Friedrich Deckel OHG., Munich, Germany, a German firm Filed Jan. 3, 1956, Ser. No. 557,183

Claims priority, application Germany Jan. 5, 1955

4 Claims. (Cl. 95—64)

This invention relates to a depth of field indicator for photographic cameras.

An object of the invention is to provide a generally improved and more satisfactory depth of field indicator.

Another object is to provide a depth of field indicator particularly adapted for an interchangeable or replaceable unit including a shutter and a focusing lens mount as well as the depth of field indicator.

Still another object is the provision of a satisfactory depth of field indicator built into a detachable or interchangeable lens and shutter unit in a manner which is particularly simple and compact.

A further object is the provision of a compact form of interchangeable unit for removal and replacement on a photographic camera, which unit incorporates a shutter, a focusing lens system, an adjustable diaphragm or stop, and a depth of field indicator, all combined in such manner as to have a neat and attractive appearance in line with the modern trend of design of photographic equipment.

These and other desirable objects may be attained in the manner disclosed as an illustrative embodiment of the invention in the following description and in the accompanying drawings forming a part hereof, in which:

Fig. 9 is a view similar to Fig. 2 showing an alternative or modified construction of the parts;

Fig. 10 is a fragmentary section on a plane transverse to the optical axis, illustrating certain of the parts shown in Fig. 9; and Fig. 11 is a view similar to Fig. 8, showing a top plan of the construction illustrated in Figs. 9 and 10.

The same reference numerals throughout the several views indicate the same parts.

Figure 1:
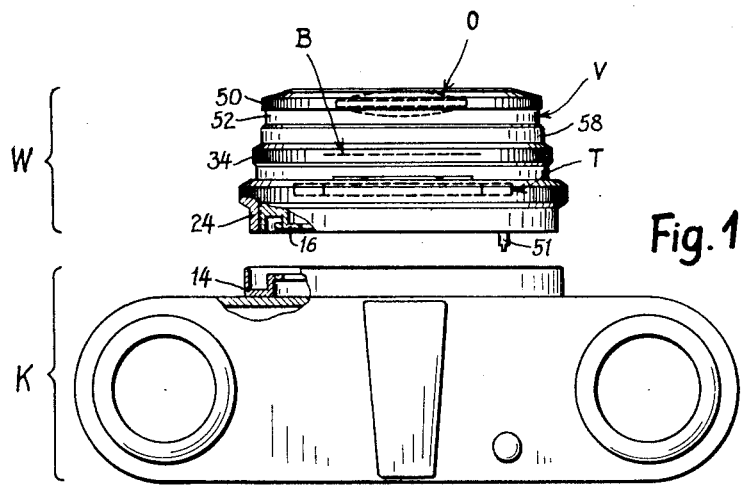
Fig. 1 is a top plan view of a camera and a detachable shutter and lens unit in accordance with a preferred embodiment of the invention, the unit being shown slightly separated from the camera in position assumed when being attached to or detached from the camera.

Referring first to Fig. 1, there is shown somewhat schematically the general outline of a camera K adapted to receive the interchangeable unit W for attachment to and detachment from the front of the camera. The unit W includes in one compact assembly a shutter V having a speed adjusting member, a lens system one component of which is shown at O and having a focus adjusting member, a diaphragm or stop B having a diaphragm aperture setting or adjusting member, and a depth of field indicator T provided with movable indicating elements or pointers. The assembly or unit W can be fitted to the front face 10 of the camera K by attaching means as best shown in Fig. 2.

Figure 2:
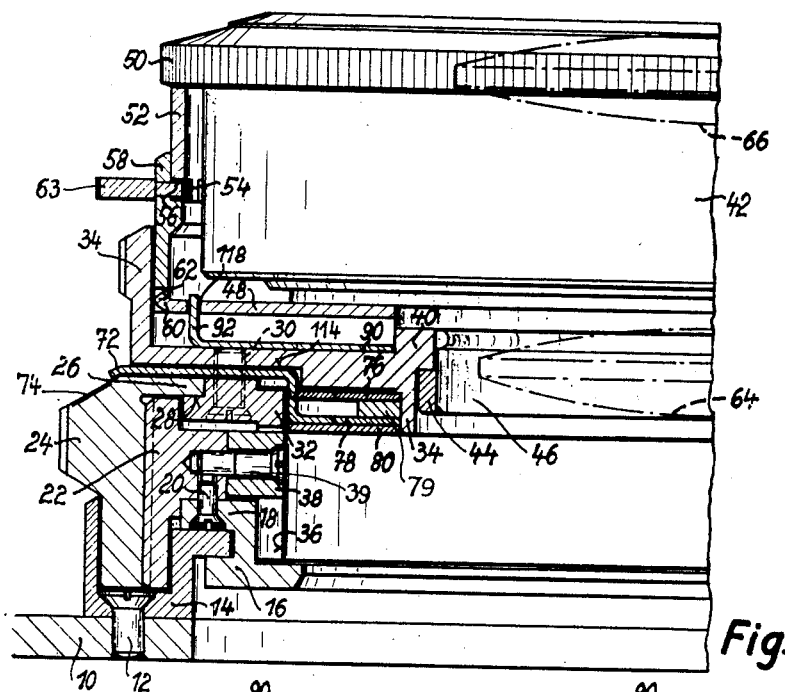
Fig. 2 is a view partly in plan and partly in radial section, through a fragment of the camera and the detachable unit, on a larger scale.

The front wall 10 of the camera has secured to it, as by means of screws 12, an annular ring 14 of the cross sectional shape best shown in Fig. 2, comprising an outer rim or flange of cylindrical form, projecting forwardly from the front wall of the camera, and an inner rim or flange also projecting forwardly and then radially inwardly and constituting a bayonet connection flange for releasably holding, in known manner, the bayonet ring 16 on the detachable unit. This bayonet ring has a mounting flange 18 connected by screws 20 to the externally threaded ring 22, surrounded by and in threaded engagement with the focus setting ring 24 rotatable on the part 22 which is, of course, stationary when the unit is secured in normal position on the camera.

As the focus adjusting ring 24 is turned on the stationary ring 22, the screw threads between these two parts cause the ring 24 to move forwardly or backwardly in the direction of the optical axis. At the front end of the ring 24 is a flange 26 which projects radially inwardly toward the center and which lies in front of a shoulder 28 on a ring 32 held by screws 30 to the body member 34 of the unit. The front face of the flange 26 abuts against the rear face of the body member 34 except where cut away for passage of the depth of field indicating pointers 70 and 72 as will be further described below.

The ring 32 has at its inner edge a cylindrical flange which fits snugly but axially slidably within the member 18 and is guided thereby for axial movement. At one or more points around its periphery, this cylindrical flange on the member 32 has an axial slot 36 in which is snugly engaged a guide pin 38 held in place by a screw 39 extending radially into the ring 22. With this arrangement, turning the focusing ring 24 will cause this ring to travel axially forwardly or rearwardly on the screw threads which connect the ring 24 to the stationary ring 22, and the axial forward or rearward movement of the ring 24 will be transmitted to the body member 34 and the ring 32, but the members 34 and 32 will be held against rotation by reason of the pin 38 engaging in the axial slot 36.

The body member 34 has a portion which extends a considerable distance radially inwardly from the externally visible part of this member and which terminates in a shouldered portion or rim 40 on which is mounted the camera shutter 42. Preferably this mounting of the shutter is accomplished by having the usual rear mounting flange or rear lens tube 46 of the shutter structure embraced within the shouldered portion 40 of the body member 34 and held therein by a nut 44 screwed onto the usual external screw threads of the mounting flange 46. The shutter is provided with the usual iris diaphragm leaves or blades (not shown) adjustable to vary the size of the aperture or stop by turning a diaphragm adjusting ring 48 rotatably mounted near the rear of the shutter casing. At its front, the shutter carries the usual adjusting ring 50, rotatable to vary or control the shutter speed or length of exposure. Photographic shutters having such diaphragm aperture adjusting rings and shutter speed adjusting rings are well known, and any suitable form of such shutter may be employed, the interior details of which are not pertinent to the present invention.

Typical examples of suitable forms of shutter which may be used for this purpose are disclosed in the copending United States patent applications of Kurt Gebele, Serial No. 514,218, filed June 9, 1955 (now Patent No. 2,900,-885, granted August 25, 1959), and Serial No. 520,875, filed July 8, 1955 (now Patent No. 2,900,886, granted August 25, 1959). The shutter is operated and controlled by any suitable known means, such as the shaft 51 (Fig. 8) extending out the rear of the detachable unit, in a direction parallel to the optical axis, and extending into the body of the camera on which the detachable unit is mounted, suitable mechanism (such as shown, e.g., in said copending application Serial No. 514,218) being provided within the camera body for turning the shaft 51 in one direction to cock or tension the shutter ready for making an exposure, and in the opposite direction for releasing or triggering the shutter to make the exposure.

The shutter speed setting ring 50 has secured to it a rearwardly extending cylindrical skirt or flange 52 surrounding the shutter casing 42. The rear edge of this flange 52 is provided, through part of its periphery, with a series of notches 54, in any selected one of which there may be seated a tooth 56 on a cylindrical coupling ring 58. The front end of this coupling ring 58 surrounds and is axially slidable on the rear portion of the flange 52, while the rear end of the coupling ring 58 extends within and is axially slidable in the fixed body member 34. A tooth 60 on the diaphragm adjusting ring 48 enters a notch 62 in the rear end of the coupling ring 58. The diaphragm adjusting ring is somewhat resilient or elastic, and normally tends to hold the coupling ring 58 in its forward position seen in Fig. 2, with the tooth 56 engaged in one of the notches 54. However, the coupling ring 58 is provided with one or more finger pieces 63 which may be easily engaged by the operator's fingers to move the coupling ring 58 slightly rearwardly, against the resilience or elasticity of the diaphragm adjusting ring 48, so as to disengage the tooth 56 from the notch 54 in which it was seated, whereupon the coupling ring 58 may be turned relative to the shutter speed adjusting parts 50, 52 to produce a different relationship of orientation, whereupon the release of the rearward pressure on the coupling ring 58 will enable the elasticity of the diaphragm setting ring 48 to move the coupling ring 58 axially forwardly again to seat the tooth 56 in the appropriate one of the notches 54.

Suitable lenses are mounted in the unit, preferably including a rear lens component 64 mounted in the rear mounting flange and lens tube 46 of the shutter structure, and a front lens component 66 mounted in the usual front lens tube customarily found in an objective shutter. Thus, although the unit is of the adjustable or variable focus type rather than the fixed focus type, no special lens mounting tubes or other special mounts are needed, since the lenses are mounted in the usual standard lens mounting tubes of the shutter structure and the entire shutter structure itself, with the lenses, moves backwardly and forwardly for focusing when the focus adjusting ring 24 is turned. It may be mentioned at this point that both the focus adjusting ring 24 and the shutter speed adjusting ring 50 are provided with circumferentially extending ribs or ridges which are serrated for easy grasping and turning by the fingers of the operator, as shown. Also the main body member 34 of the unit has a circumferentially extending raised rib or ridge likewise serrated, as shown, for easy grasping in order to turn the entire unit when mounting it on or taking it off of the camera by engaging or disengaging the bayonet connection parts 14, 16.

Figure 3:
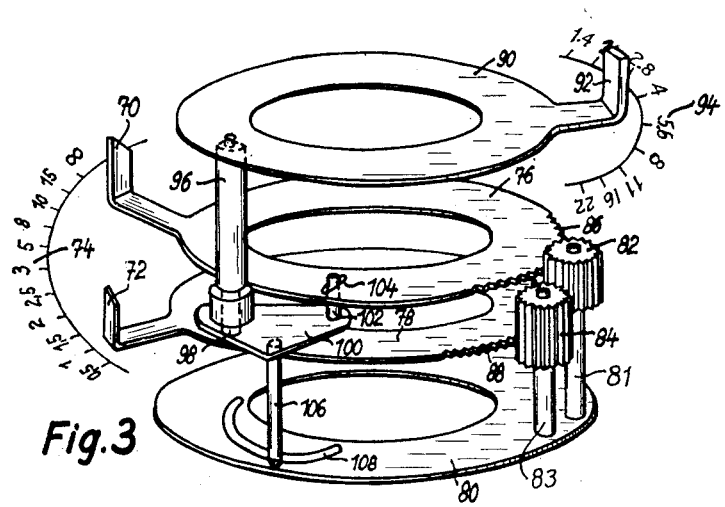
Fig. 3 is a diagrammatic perspective view of the parts of the unit which operate the depth of field indicator, illustrating somewhat diagrammatically the operation thereof.
Figure 8:
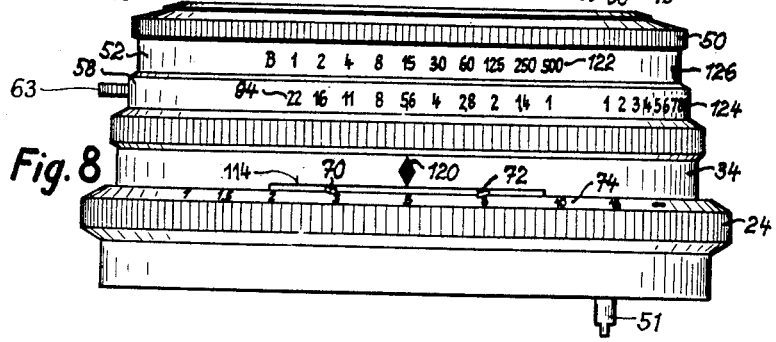
Fig. 8 is a plan view or edge view of the detachable unit in its preferred form, detached from the camera.

As already mentioned, the preferred structure of the present invention includes depth of field indicating mechanism incorporated in the detachable unit along with the shutter, the lenses, the diaphragm aperture adjusting parts, and the focus adjusting parts. The depth of field indicator comprises two pointers or indicating arms 70 and 72 (Figs. 2, 3, and 8) which extend outwardly through a circumferential slot 114 (Figs. 2 and 8) in the body member 34 and which have ends which sweep over and are read in conjunction with the distance graduations on the focusing scale 74 which is marked on the focus adjusting ring 24 as seen in Figs. 2 and 8 and as also illustrated diagrammatically in Fig. 3. These pointers 70 and 72 are formed as arms on rings 76 and 78, respectively, which rotate on a flange of the body member 34 and are slightly separated from each other by a spacing sleeve 79 between them, and are held in place by a ring 80 fixed to the part 34.

Figure 7:
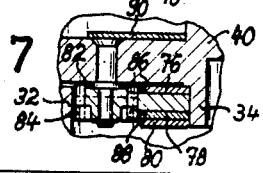
Fig. 7 is another fragmentary radial section through still other parts of the unit.

On a suitable stationary part is a short shaft 81 on which is rotatably mounted a pinion 82, and a second shaft 83 on which is rotatably mounted a pinion 84. Gear teeth 86 are formed on part of the periphery of the ring 76, and gear teeth 88 on part of the periphery of the second ring 78. The pinion 82 meshes with the gear teeth 86 on the ring 76 but not with the gear teeth 88, while the second pinion 84 meshes with the gear teeth 88 on the ring 78 and also overlaps the first pinion 82 and meshes therewith, but does not mesh with the gear teeth 86. By this arrangement, whenever either one of the rings 76 and 78 is turned, the gears will serve to turn the other ring through the same distance in the opposite direction. In the diagrammatic view, Fig. 3, the shafts 81 and 83 are shown as fixed to the stationary ring 80, but in the actual construction it is preferred to mount these shafts on the stationary body member 34, as seen in Fig. 7. In referring to the parts 34 and 80 as being stationary, this is understood to mean that the parts do not rotate when various other parts, such as the rings 76 and 78 are rotated. Actually the parts 34 and 80 are not strictly stationary because they move axially forwardly or backwardly when focusing the unit.

Figure 5:
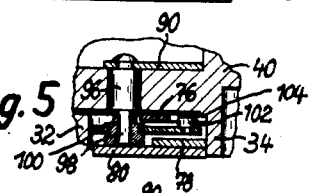
Fig. 5 is a similar fragmentary section through other parts.

In order to connect the depth of field indicating rings 76 and 78 in an operative manner to the diaphragm aperture adjusting ring 48, the construction includes still another ring 90 rotatably mounted on the front side of the radial wall of the body member 34, as seen in Fig. 2. This ring 90 has a forwardly bent ear 92 which engages in an opening 118 in the diaphragm aperture adjusting ring 48 of the shutter structure, so that whenever the ring 48 is turned, the ring 90 will turn with it to an equal extent. Thus the ring 90 (together with the ring 48) turns relative to the diaphragm aperture scale or stop scale 94, indicated schematically in Fig. 3 and shown in Fig. 8 in its normal actual position, placed on the exterior surface of the coupling ring 58. The ring 90 has securely fixed to it a pin or post 96 which extends rearwardly parallel to the optical axis and passes through an arcuate slot in the radial part of the body member 34, as seen in Fig. 5. On the reduced rear end 98 of the pin 96 there is rotatably mounted a plate 100 which forms part of a transmission system interposed between the ring 90 and the depth of field indicator rings 76 and 78, so that the turning movements of the ring 90 may be transmitted to the rings 76 and 78 in a non-linear manner as required for correct and accurate operation.

Figure 6:
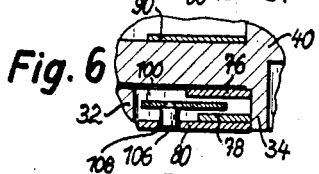
Fig. 6 is a similar fragmentary section through other parts.

This plate 100 carries a pin 102 which projects forwardly into a slot 104 formed radially in the ring 76, as seen in Fig. 5. On a different radius from the pin 98, spaced angularly from a radius drawn through the pin 102, the plate 100 also carries a second pin 106 which projects rearwardly, as seen in Fig. 6, into a control slot or cam slot 108 formed in the stationary plate 80. As will be understood from a study of the diagrammatic view, Fig. 3, this cam slot 108 can be shaped in any manner required to swing the plate 100 on its pivot 98 at the same time that the pivot and plate travel bodily with the turning of the ring 90. Whenever the plate 100 travels without turning on its pivot 98, the rings 76 and 78 will turn through the same extent as the ring 90, so that the pointers 70 and 72 will be brought closer together or farther apart, depending upon the direction of rotation of the ring 90, and the angular movements of the rings 76 and 78 will be the same as the angular movement of the ring 90, so long as no turning of the plate 100 occurs. However, through much of the range of travel of the parts, there is a non-linear relation between the turning of the ring 90 and the change in depth of field, as is well understood in the art. Hence by shaping the cam slot 108 to swing the plate 100 on its pivot 98 while it travels bodily with the pivot, the correct non-linear relation may be established between the turning movements of the ring 90 and the turning movements of the depth of field indicator rings 76 and 78.

Figure 4:
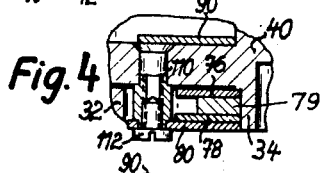
Fig. 4 is a fragmentary radial section through certain parts of the unit.

It has been mentioned already that the stationary ring 80 is fixed to the body member 34. This may conveniently be done by means of spacer studs 110 (Fig. 4) riveted in the radially extending wall of the body member 34 and projecting rearwardly therefrom to the plate 80, which is secured to the studs 110 by screws 112.

The arrangement of the various externally visible scales is best seen in Fig. 8. The body member 34 is provided with a main index mark 120, located just ahead of the circumferential slot 114 through which the depth of field indicating pointers 70 and 72 project. The focusing scale 74 is read in conjunction with this index mark 120, and the depth of field pointers 70 and 72 are read in conjunction with the focusing scale or distance scale 74. The diaphragm aperture scale 94 is arranged, as already mentioned, on the periphery of the coupling ring 58, and is read in conjunction with the same main index mark 120. The skirt or flange portion 52 of the shutter speed setting or adjusting ring 50 carries the shutter speed scale 122, which likewise is read in conjunction with the main index mark or reference point 120. The diaphragm aperture scale 94 and the shutter speed scale 122 are arranged in a complementary manner to each other, as seen in Fig. 8, so that for a given light value and given film speed and filter factor, various possible pairs of shutter speed values and diaphragm aperture values will be opposite each other, and any selected pair of these may be brought opposite the index mark 120. By pressing rearwardly on the finger piece 63 of the coupling ring 58, the tooth 56 may be disengaged from the notch 54 in which it was seated, and may be turned to a different position relative to the parts 50, 52, to set the shutter for a different exposure value, and the setting for different exposure values may be facilitated by means of an exposure value scale 124 placed on the coupling ring 58 and read in conjunction with a separate index mark 126 placed on the portion 52 of the shutter speed setting ring.

In the particular position shown by way of example in Fig. 8, the shutter is shown as set for an exposure of $\frac{1}{15}$ of a second, at a diaphragm aperture of $f:5.6$. Also the mechanism is shown as set for a focus of five meters, and the pointers 70 and 72 show that the depth of field extends from about three meters to nearly eight meters, within which range the objects spaced along the optical axis will be in sufficiently sharp focus.

Since the operator has the depth of field indicating pointers 70 and 72 to guide him as to the distance of the closest and farthest objects which will appear in acceptably sharp focus, he does not have to rely on the conventional diaphragm aperture scale 94 to give him an indication of the depth of field, nor does he have to rely on this diaphragm aperture scale as an aid in determining the proper exposure, for this can be determined by reference to the exposure value scale 124, which shows the relative positions of orientation of the shutter speed setting member and the diaphragm aperture setting member, regardless of the absolute positions of either of them. Therefore, it is seen that the diaphragm aperture scale 94 may be entirely omitted if desired. Really it adds nothing to the information given to the user of the device, when the various other scales above mentioned are present, and it merely confuses the amateur or beginner with one more scale which is unnecessary to him. The ability to obtain all necessary information and make all necessary decisions for taking the picture, without reference to a diaphragm aperture scale, shows clearly that, contrary to previously accepted reasoning, the matter of depth of field is not dependent solely upon diaphragm aperture but is dependent partly also upon shutter speed, because a change in shutter speed (under given or constant light conditions) serves to change the diaphragm aperture setting through the connection effected by the coupling ring 58, and thereby changes the depth of field indicator.

An alternative or modified form of construction is shown in Figs. 9–11 of the drawings. In this second form, most of the parts are the same as in the first form, and are indicated by the same reference numerals, so that no further description of these parts is required. It will be sufficient to describe the parts which are changed from the previous construction.

In this second form, the front wall 10 of the camera has fixed to it, as by means of screws 212, the bearing ring 214 which has a radial shoulder 216 overlapping a radial face or shoulder 218 on a ring 220 which is rotatable in a recess 222 in the front wall 10 of the camera. This rotary ring 220 is internally threaded to engage external threads on the axially displaceable ring 224 which is held against rotation by means of a post 226 fixed to the camera wall and engaging an axial slot 228 in the ring 224. At the front of the ring 224 there is a flange extending radially inwardly and provided with bayonet slots 230 which engage and mate with bayonet lugs 231 on the bayonet ring 232 which is secured by the screw 233 to the rear of the main body member 34 which is essentially the same as the main body member 34 in the previous embodiment. Thus when the ring 220 is turned, the ring 224 will be moved axially for focusing purposes and will carry with it the entire detachable unit which is mounted on the ring 224 by means of the bayonet connection parts 230 and 231.

A circumferential recess 236 in the periphery of the bayonet ring 232 receives rotatably a radial flange 237 on a ring 238 which is thus mounted for rotation on the detachable unit and which surrounds the rotating ring 220 of the camera unit when the detachable unit is in place on the camera unit. This ring 238 serves as the rotating ring for adjusting the focus of the detachable unit.

For the purpose of coupling the focus adjusting ring 238 to the internal focus adjusting ring 220, the ring 238 is provided with a radially extending pin 240 mounted for limited radial movement in a finger piece 242 which projects from one side of the ring 238, and which is provided with a spring 244 constantly tending to move the pin radially inwardly to engage the inner end thereof in a notch 246 formed axially in the ring 220. The outer end 248 of the pin 240 projects outwardly beyond the finger piece 242, as seen in Fig. 10, whenever the inner end of the pin is not seated in the notch or groove 246, and this outer end 248 can be brightly colored (e.g., red) to serve as a warning to the operator that the pin is not seated in the notch and the parts are not coupled together. When the pin comes opposite the groove 246 and drops into the groove, the outer end 248 becomes flush with the finger piece 242 and is no longer visible.

When the interchangeable or replaceable unit is fitted to the camera by engaging the bayonet connection parts 230 and 231 properly with each other, the rotation of the interchangeable unit when engaging the bayonet parts with each other will frequently carry the pin 240 around to the groove 246 to couple the parts 238 and 220 to each other. If not, the operator will notice the projecting end 248 of the coupling pin and will rotate the ring 238 in one direction or the other until the pin 240 comes opposite the groove 246 and snaps into it, thereby coupling the parts for subsequent conjoint rotation. The focusing scale 74 is placed on the ring 238 as seen in Fig. 11 and is read, just as in the previous embodiment, in connection with the main reference point 120 placed on the body 34. The depth of field indicating pointers 70 and 72 come out as before through a circumferential slot 114 in the body 34 and are read in conjunction with the focusing scale 74.

It will be noted that in the first described form of the invention (Figs. 2 to 8) the relatively rotatable parts (22 and 24) which have screw threaded engagement with each other for causing axial movement for focusing, are both mounted on the detachable and replaceable unit, rather than being mounted on the camera. In the second form of the invention (Figs. 9–11) these relatively rotatable screw threaded parts (220 and 224) which cause the axial focusing movement are both mounted on the camera and stay with the camera when the detachable unit is removed, rather than being mounted on the detachable unit. Otherwise, the two forms of the invention are essentially the same. Both forms of the invention embody a compact arrangement of all structural parts (including the shutter, the lenses, the adjustable diaphragm, and the depth of field indicating means) in a single interchangeable unit of neat and attractive design according to present-day tendencies or trends in design of photographic equipment. The various setting or adjusting members together with their scales are arranged closely together, which facilitates the operation or manipulation of the structure. Removal of the unit from the camera and the fitting of another interchangeable unit in its place can be accomplished very easily and quickly.

The relative arrangement or disposition of the individual parts is not limited to the particular structures which have been illustrated merely as examples. Various modifications can be made, to adapt them to varying circumstances. Also, the depth of field indicator may be constructed in various other ways, and it may be built into the assembly or into the shutter housing at some other place than the particular location illustrated.

It will be understood that the foregoing specific disclosure is given by way of illustrative example only, rather than by way of limitation, and that without departing from the invention, the details may be varied within the scope of the appended claims.

What is claimed is:

1. The combination with a photographic camera body, of a removable and interchangeable unit adapted to be mounted on said camera body, said unit comprising a shutter having an optical axis, a lens having at least one component movable relative to said camera body in a direction along said optical axis for focusing, a focusing distance scale substantially concentric with said optical axis, a diaphragm aperture adjusting member rotatable about said optical axis as a center, and depth of field indicating means cooperating with said distance scale to be read in conjunction therewith and operatively connected to said aperture adjusting member to be moved thereby, said depth of field indicating means including two pointer members rotatable concurrently in opposite directions about said optical axis as a center and sweeping over said focusing distance scale.

2. The combination with a photographic camera body, of a removable and interchangeable unit adapted to be mounted on said camera body, said unit comprising a shutter having an optical axis, a lens having at least one component movable relative to said camera body in a direction along said optical axis for focusing, a focusing distance scale substantially concentric with said optical axis, a diaphragm aperture adjusting member rotatable about said optical axis as a center, and depth of field indicating means cooperating with said distance scale to be read in conjunction therewith and operatively connected to said aperture adjusting member to be moved thereby, and interengaging bayonet connection parts mounted on said camera body and said unit for detachably connecting them to each other, said depth of field indicating means including two pointer members rotatable concurrently in opposite directions about said optical axis as a center and sweeping over said focusing distance scale.

3. The combination with a photographic camera body, of a removable and interchangeable unit adapted to be mounted on said body, said unit comprising a shutter having an optical axis, a lens having at least one component movable relative to said camera body in a direction along said optical axis for focusing, a diaphragm aperture adjusting member rotatable about said optical axis as a center in a transverse plane intermediate the axial length of said removable unit, a focus adjusting member rotatable about said optical axis as a center substantially at the rear end of said removable unit, a focusing distance scale carried by said focus adjusting member and arranged substantially concentric with said optical axis, a pair of field pointer rings rotatable in opposite directions about said optical axis and located between said focus adjusting member and said aperture adjusting member, a pair of pointers, one on each of said rings, arranged to sweep over said focusing distance scale as said rings are rotated, and means for rotating said rings by rotation of said aperture adjusting member.

4. The combination with a photographic camera body, of a removable and interchangeable unit adapted to be mounted on said body, said unit comprising a shutter having an optical axis, a lens having at least one component movable relative to said camera body in a direction along said optical axis for focusing, a diaphragm aperture adjusting member rotatable about said optical axis as a center in a transverse plane intermediate the axial length of said removable unit, a focus adjusting member rotatable about said optical axis as a center substantially at the rear end of said removable unit, a focusing distance scale carried by said focus adjusting member and arranged substantially concentric with said optical axis, a pair of field pointer rings rotatable in opposite directions about said optical axis and located between said focus adjusting member and said aperture adjusting member, a pair of pointers, one on each of said rings, arranged to sweep over said focusing distance scale as said rings are rotated, and means pivotally carried by and movable bodily with said aperture adjusting member for rotating said rings by rotation of said aperture adjusting member.

References Cited in the file of this patent

UNITED STATES PATENTS

| | | |
|---|---|---|
| 2,319,083 | Nowack et al. | May 11, 1943 |
| 2,331,658 | Crumrine | Oct. 12, 1943 |
| 2,342,819 | Priesemann | Feb. 29, 1944 |
| 2,350,009 | Babcock et al. | May 30, 1944 |
| 2,472,586 | Harvey | June 7, 1949 |

FOREIGN PATENTS

| | | |
|---|---|---|
| 139,562 | Austria | Nov. 26, 1934 |
| 1,028,877 | France | Mar. 4, 1953 |
| 1,111,448 | France | Oct. 26, 1955 |